W. W. TICE.
Cooking-Vessel.
No. 131,479.
Patented Sep. 17, 1872.
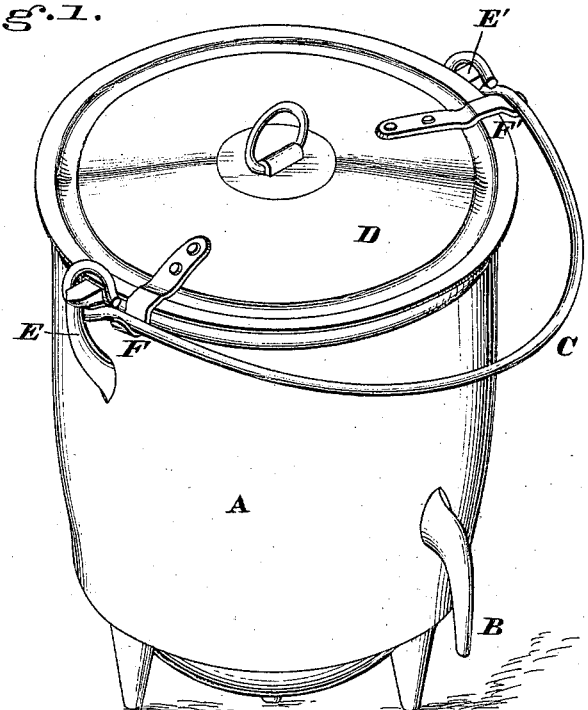
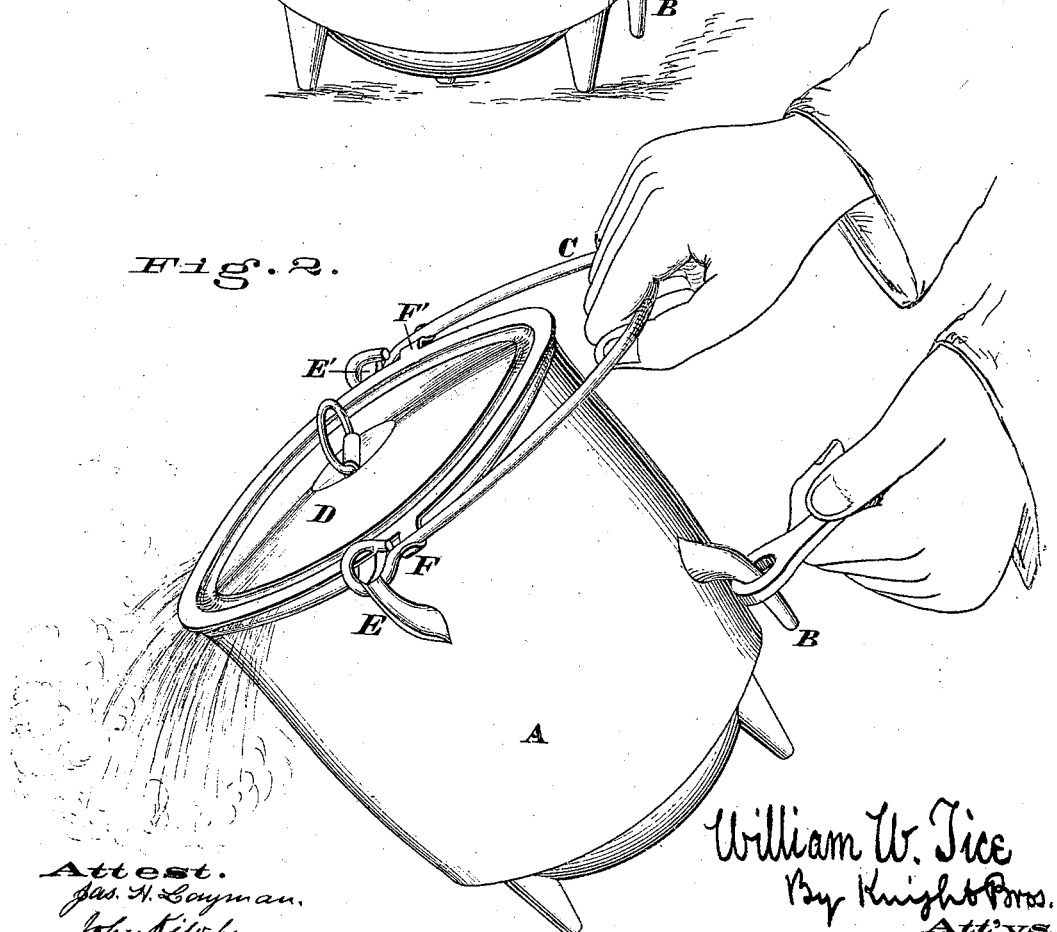

UNITED STATES PATENT OFFICE.

WILLIAM W. TICE, OF CALIFORNIA, OHIO.

IMPROVEMENT IN COOKING-VESSELS.

Specification forming part of Letters Patent No. 131,479, dated September 17, 1872.

*To all whom it may concern:*

Be it known that I, WILLIAM W. TICE, of California, Hamilton county, Ohio, have invented a Cooking-Vessel, of which the following is a specification:

Although applicable to all boiling-vessels, my invention is particularly designed as an improvement on the ordinary cast pot for boiling purposes; and consists, as to its first part, in the provision upon the lid of such a pot of two ears, whereby the lifting-bail is supported in a convenient position for being grasped by the operator, and whereby, also, said bail becomes effective to hold the lid securely upon the pot without scalding the operator's hands in the act of drawing off the liquid contents; and my invention consists, as to its second part, in the provision of a lug or handle, which, projecting from the side of the pot-body, is used, in conjunction with the elements of the said first part, in tipping or tilting of the pot for drawing its contents, as aforesaid.

In the accompanying drawing, a pot embodying my invention is represented by Figure 1 in the erect, and by Fig. 2 in the tilted, position.

A is the pot-body; B, a lug or cast projection from said body, near its lower end, and in vertical plane at right angles to that of the lifting-bail C. Projecting from the lid D, both of them on the same side of and near to the bail-ears E E', are two rests, F F', which serve to support the lifting-bail in a horizontal position convenient for grasping, and which also enables the operator to hold down the lid by means of the said bail in the operation of drawing off the liquid contents of the pot without danger of scalding her hands in so doing.

In the drawing these rests are shown as being secured to the lid with rivets, but it is evident that said rests and lid may be "struck up" from a single piece of sheet metal, so as to dispense with rivets or other attachments. In some cases it may be desirable to cast the lid and its rests in one piece.

Claim.

I claim as new and of my invention—

1. As an article of manufacture, a pot-lid provided with projecting rests F F', substantially as and for the purpose set forth.

2. The cover D, provided with lugs or rests F F', in combination with a bailed vessel, substantially as set forth.

In testimony of which invention I hereunto set my hand.

WILLIAM W. TICE.

Attest:
 G. H. KNIGHT,
 JAMES H. LAYMAN.